United States Patent
Chiproot

(10) Patent No.: US 10,900,597 B2
(45) Date of Patent: Jan. 26, 2021

(54) ANTI-CORROSION PIPE SYSTEM WITH ADJUSTABLE LENGTH

(71) Applicant: Eliezer Krausz Industrial Development Ltd., Tel Aviv (IL)

(72) Inventor: Avi Chiproot, Kfar-Saba (IL)

(73) Assignee: Krausz Industries Ltd., Rosh HaAyin (IL)

( * ) Notice: Subject to any disclaimer, the term of this patent is extended or adjusted under 35 U.S.C. 154(b) by 379 days.

(21) Appl. No.: 15/825,407

(22) Filed: Nov. 29, 2017

(65) Prior Publication Data

US 2019/0162341 A1    May 30, 2019

(51) Int. Cl.
| | | |
|---|---|---|
| *F16L 25/04* | (2006.01) | |
| *F16L 58/18* | (2006.01) | |
| *F16L 21/03* | (2006.01) | |
| *F16L 21/06* | (2006.01) | |
| *F16L 27/12* | (2006.01) | |
| *F16L 21/08* | (2006.01) | |

(52) U.S. Cl.
CPC .............. *F16L 25/04* (2013.01); *F16L 21/03* (2013.01); *F16L 21/065* (2013.01); *F16L 27/1273* (2019.08); *F16L 58/185* (2013.01); *F16L 21/08* (2013.01)

(58) Field of Classification Search
CPC ....... F16L 27/12; F16L 27/1273; F16L 21/08; F16L 21/03; F16L 21/065; F16L 58/185; F16L 25/04; F16L 25/025
USPC ....................................................... 285/302
See application file for complete search history.

(56) References Cited

U.S. PATENT DOCUMENTS

| | | | |
|---|---|---|---|
| 1,983,228 A | 12/1934 | Hall | |
| 3,278,202 A | 10/1966 | Smith | |
| 6,257,625 B1 * | 7/2001 | Kitani | F16L 27/12 |
| 8,764,066 B1 * | 7/2014 | Rice | F16L 27/12 |
| | | | 285/302 |
| 2006/0087121 A1 * | 4/2006 | Bradley | F16L 21/08 |
| 2011/0031737 A1 | 2/2011 | Krausz | |
| 2012/0025524 A1 * | 2/2012 | Krausz | F16L 21/08 |
| 2013/0049354 A1 * | 2/2013 | Chase | F16L 27/12 |
| 2014/0217720 A1 * | 8/2014 | Levy | |
| 2014/0319826 A1 | 10/2014 | Chiproot | |
| 2016/0131289 A1 * | 5/2016 | Spears | F16L 27/12 |
| | | | 285/302 |
| 2016/0153597 A1 * | 6/2016 | Correa | F16L 27/12 |
| | | | 285/302 |

FOREIGN PATENT DOCUMENTS

EP    0170129    2/1986

OTHER PUBLICATIONS

PCT Search Report and Written Opinion PCT/IB2018/059221, dated Feb. 19, 2019.

* cited by examiner

*Primary Examiner* — Zachary T Dragicevich
(74) *Attorney, Agent, or Firm* — Dekel Patent Ltd.; David Klein

(57) ABSTRACT

A pipe system includes a first pipe section and a second pipe section arranged, and together defining a total length, along a longitudinal axis. The first and second pipe sections are movable with respect to each other so as to shorten or lengthen the total length. A fixation member clamps a portion of the second pipe section to a portion of the first pipe section. The fixation member includes an insulator which is electrically insulating and passes no electrical current between the first and second pipe sections.

8 Claims, 4 Drawing Sheets

ANTI-CORROSION PIPE SYSTEM WITH ADJUSTABLE LENGTH

FIELD OF THE INVENTION

The present invention relates generally to pipe couplings, and particularly to an anti-corrosion pipe system with adjustable length.

BACKGROUND OF THE INVENTION

Pipes made of metal, such as cast iron, ductile iron or steel alloys, which are laid in the ground near sources of direct electrical current, such as near electrical railways, are prone to corrosion problems caused by stray current. The stray current can reach the buried pipes, entering at one point along the pipe path and exiting at a different point spaced longitudinally from the entry point. At the point of entry of the stray current, a partial cathodic reaction takes place; at the exit point, an anodic partial reaction occurs. The result is corrosion of metal all along the longitudinal path between entry and exit. The problem is particularly great in water pipes.

Anti-corrosion coatings have been used on pipes to help prevent or reduce corrosion. In some cases, seals that provide electrical resistance have been used between pipe sections to limit the length of the longitudinal path. However, in any case, the pipe sections must be welded or otherwise connected on site, and this work often involves guesswork and rework which causes time delays and increases labor costs.

SUMMARY OF THE INVENTION

The present invention seeks to provide an anti-corrosion pipe system with adjustable length, as is described more in detail hereinbelow.

There is thus provided in accordance with an embodiment of the present invention a pipe system including a first pipe section and a second pipe section arranged, and together defining a total length, along a longitudinal axis, the first and second pipe sections being movable with respect to each other so as to shorten or lengthen the total length, and a fixation member that clamps a portion of the second pipe section to a portion of the first pipe section, the fixation member including an insulator which is electrically insulating and passes no electrical current between the first and second pipe sections.

In accordance with an embodiment of the present invention the first and second pipe sections are telescopic with each other.

In accordance with an embodiment of the present invention the first and second pipe sections further include one or more axial fixation members, which may be electrically insulating or have an electrically insulating portion.

In accordance with an embodiment of the present invention the one or more axial fixation members include a bar or rod secured to lugs, which extend from the first and second pipe sections, respectively, and the insulator includes an electrically insulating bushing that sits in each of the lugs.

In accordance with an embodiment of the present invention the fixation member is an annular fixation member including a grip ring that clamps against an electrically insulating sleeve wrapped around an outer contour of the first pipe section, wherein the grip ring does not pierce the sleeve. (The electrically insulating sleeve is the insulator.)

In accordance with an embodiment of the present invention at least one of the outer ends of the first and second pipe sections respectively, includes a pipe connection, and the pipe connection includes an annular seal plus a grip ring.

In accordance with an embodiment of the present invention the first and second pipe sections are coated with an anti-corrosion coating.

In accordance with an embodiment of the present invention at least one of the first and second pipe sections includes a cathodic protection outlet.

In accordance with an embodiment of the present invention at least one of the first and second pipe sections includes a lifting ear.

BRIEF DESCRIPTION OF THE DRAWINGS

The present invention will be understood and appreciated more fully from the following detailed description, taken in conjunction with the drawing in which.

DETAILED DESCRIPTION OF EMBODIMENTS

Reference is now made to FIGS. 1-5, which illustrate an adjustable-length anti-corrosion pipe system 10, constructed and operative in accordance with a non-limiting embodiment of the present invention.

The anti-corrosion pipe system 10 includes a first pipe section 12 that is arranged to slide in and out of a second pipe section 14. In other words, the first and second pipe sections 12 and 14 are telescopic with each other.

Figure 1:
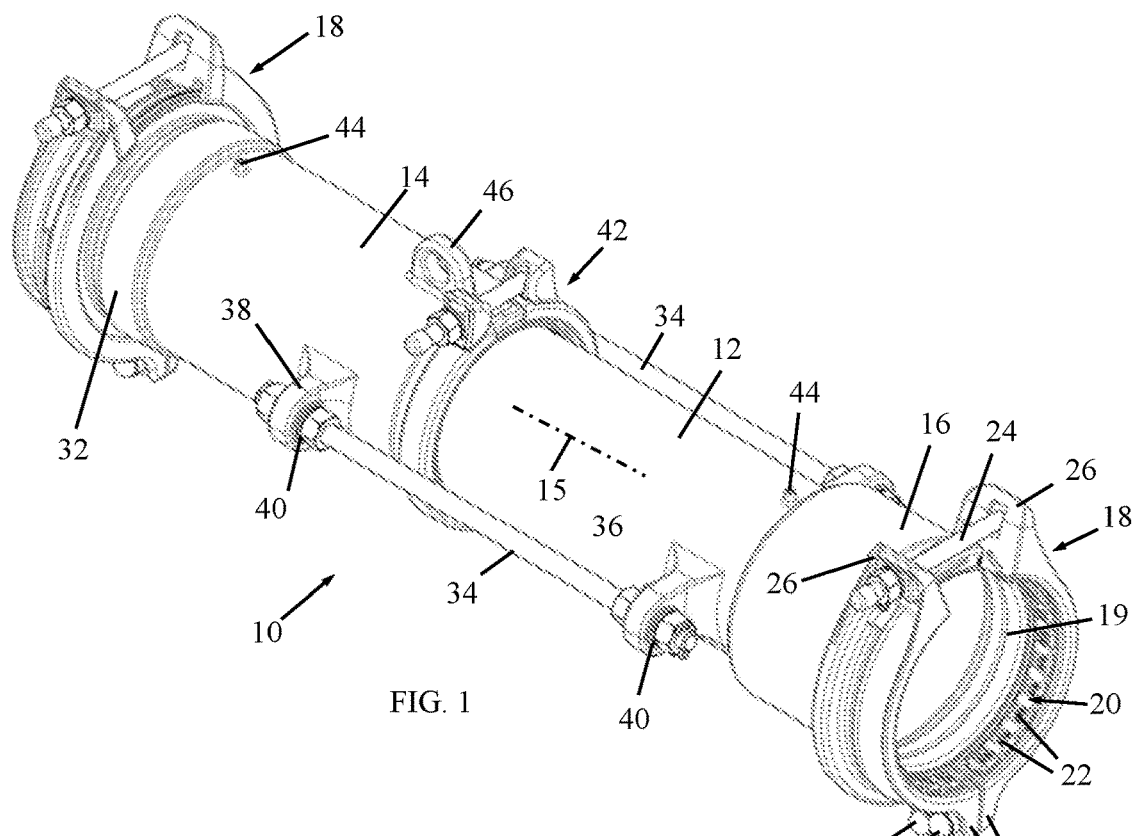
FIG. 1 is a simplified pictorial illustration of an adjustable-length anti-corrosion pipe system, constructed and operative in accordance with a non-limiting embodiment of the present invention, in an elongate, extended orientation, and including grip rings at both ends of the pipe system.

In the embodiment of FIG. 1, an outer end 16 of first pipe section 12 is equipped with a pipe connection 18 for receiving therein a pipe (not shown; such as another pipe in a water piping system). The pipe connection 18 is provided with an annular seal 19 plus a grip ring 20 for sealing the pipe which is inserted into the pipe connection 18. The annular seal 19, which may be made of a natural or artificial elastomeric material, may include one or more layers nested in each other. In this manner, one of the nested seals can be removed to accommodate sealing against pipes of different diameters. Annular seal 19 may be located axially inwards of the grip ring 20; alternatively annular seal 19 may be located axially outwards of the grip ring 20.

One or more of the layers of annular seal 19 may include an outer portion folded over an inner portion so as to define an inner space between and bounded by the inner and outer portions. The inner space is in fluid communication with a fluid flowing in the pipe. The fluid enters the inner space and applies pressure therein to increase tightening of the seal.

Grip ring 20 includes wedge-shaped grip elements 22 that are radially spaced from one another about a ring member, such as springs that connect adjacent grip rings with one another. The grip elements 22 are formed with teeth that face inwards towards the center of the grip ring 20. One or more tightening elements 24 (e.g., bolts and nuts or other tightenable fasteners) pass through clamp members 26 of pipe connection 18. The tightening elements 24, when tightened in a direction transverse to the axial length of the pipe, press both the annular seal 19 and the grip ring 20 against the surface of the pipe. Annular seal 19 is radially squeezed and sealingly clamped against the outside surface of the pipe when tightening elements 24 fasten and tighten clamp members 26 towards each other. The teeth of the wedge-shaped grip elements 22 are forced into the outside surface of the pipe when tightening elements 24 fasten and tighten clamp members 26 towards each other.

The clamp members 26 may be formed at ends of a continuous, partial ring; alternatively, as shown, the ring is not continuous but rather is formed of two sections clamped together opposite to the clamp members 26 by fasteners 28 that pass through lugs 30.

In the embodiment of FIG. 1, an outer end 32 of second pipe section 14 is also equipped with the same type of pipe connection 18 for receiving therein a pipe (not shown; such as another pipe in a water piping system).

Accordingly, the first pipe section 12 and second pipe section 14 are arranged, and together define a total length, along a longitudinal axis 15, and first and second pipe sections 12 and 14 are movable with respect to each other so as to shorten or lengthen the total length.

The telescoping first and second pipe sections 12 and 14 are easily adjusted on site in the field to a desired length. They are then fixed at the desired length by two different fixation members. First, an annular fixation member 42 clamps a portion of second pipe section 14 to a portion of first pipe section 12. The annular fixation member 42 may include annular seal 19 described above.

Second, one or more axial fixation members 34 (e.g., a rod or bar) are secured to lugs 36 and 38 extending from first and second pipe sections 12 and 14, respectively. The axial fixation member 34 may be secured to lugs 36 and 38 by means of nuts 39 (which tighten against the lug) and an electrically insulating bushing (insulator) 40 (such as a plastic bushing) that sits in each of lugs 36 and 38. The electrically insulating bushing 40 ensures no electrical current is passed between first and second pipe sections 12 and 14. Alternatively or additionally, the axial fixation members 34 may be electrically insulating or have an electrically insulating portion.

The first and second pipe sections 12 and 14 may be made of ductile iron, cast iron, steel alloy and other metals. The first and second pipe sections 12 and 14 may each be coated with an anti-corrosion coating against the effects of stray current, such as but not limited to, a fusion bonded epoxy coating, a polyurethane coating or others. In addition, first and/or second pipe sections 12 and 14 may include a cathodic protection outlet 44, such as but not limited to, a threaded lug (e.g., ¼-20 UNC), to which sacrificial corrosion elements may be attached (the sacrificial corrosion elements corrode instead of the pipes, due to galvanic corrosion) or to which electrical conductors may be attached.

Either or both of first and second pipe sections 12 and 14 may include a lifting ear 46.

Figure 2:
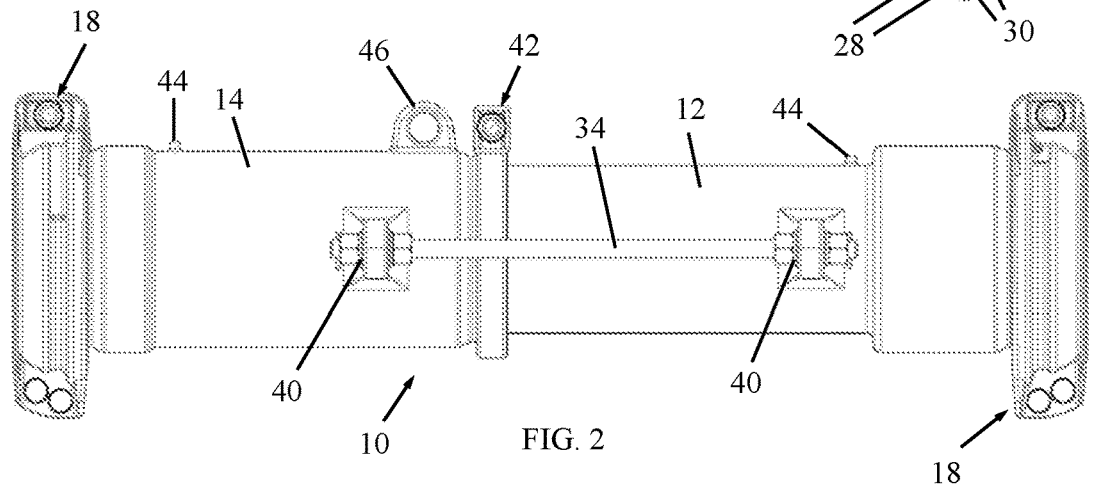
FIG. 2 is a side view of the pipe system.
Figure 3:
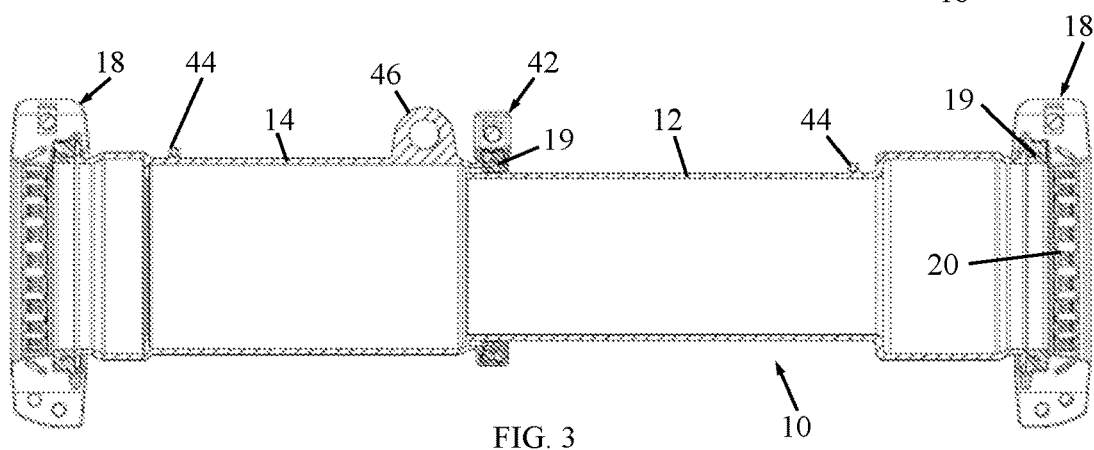
FIG. 3 is a sectional, side view of the pipe system.
Figure 4:
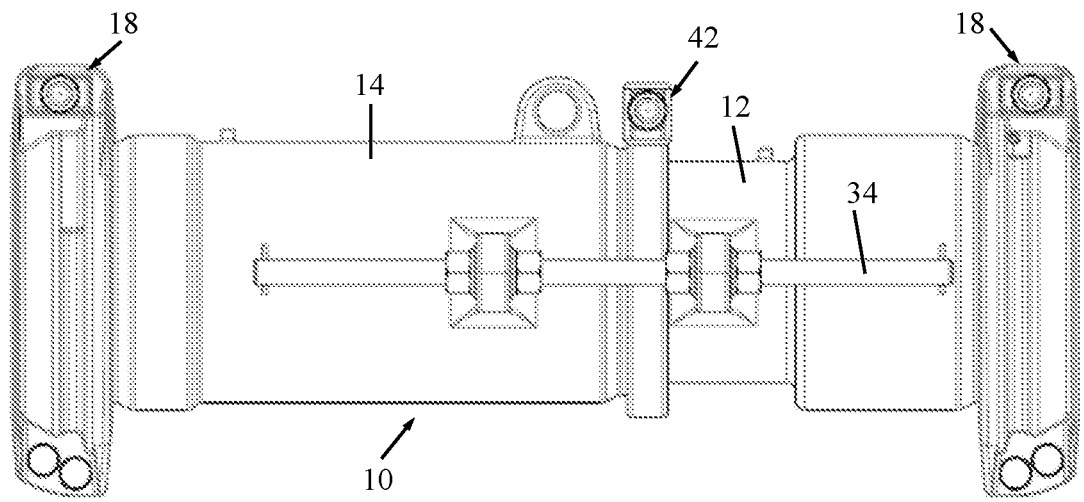
FIG. 4 is a side view of the pipe system, in a contracted, shortened orientation.
Figure 5:
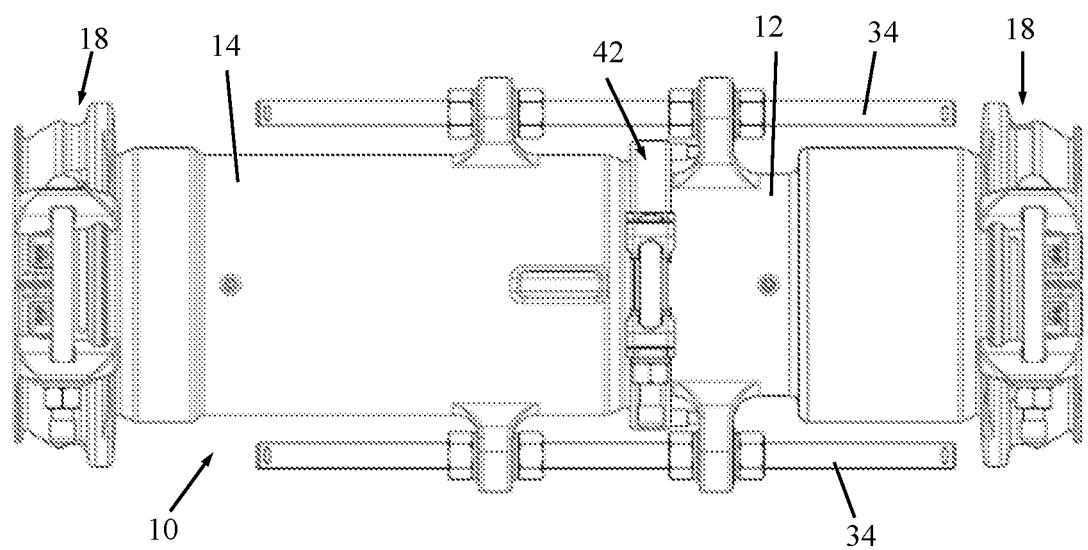
FIG. 5 is a top view of the pipe system, in the contracted orientation.

FIGS. 1-3 show the adjustable-length anti-corrosion pipe system 10 in an elongate, extended orientation. FIGS. 4-5 show the adjustable-length anti-corrosion pipe system 10 in a contracted orientation.

Figure 6:
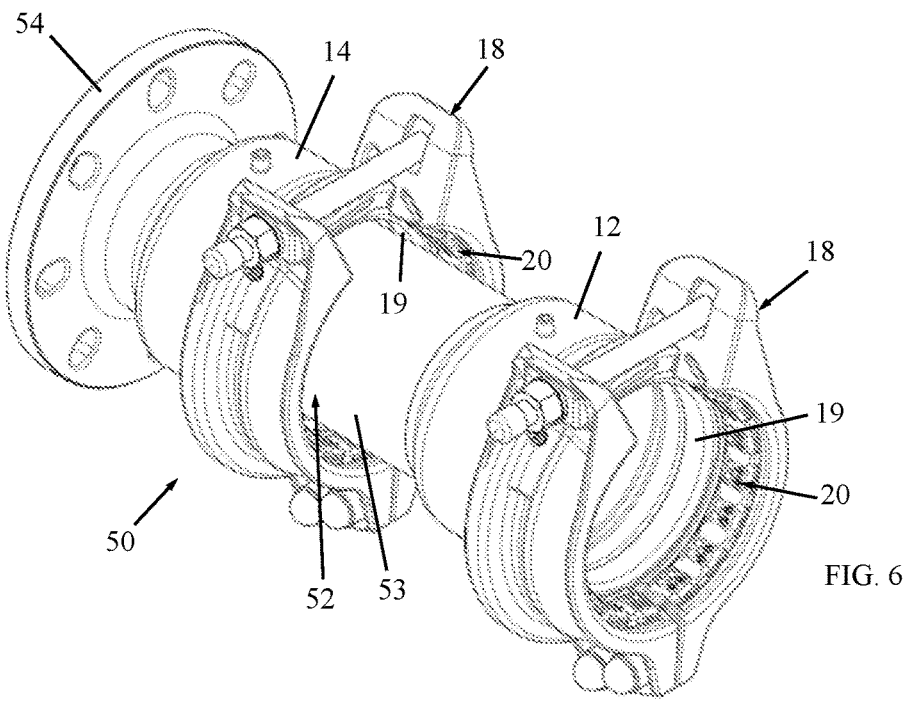
FIGS. 6, 7 and 8 are simplified pictorial, side-view and sectional illustrations, respectively, of an adjustable-length anti-corrosion pipe system, constructed and operative in accordance with another non-limiting embodiment of the present invention, and including a grip ring at one end of the pipe system and a flange at the opposite end.
Figure 7:
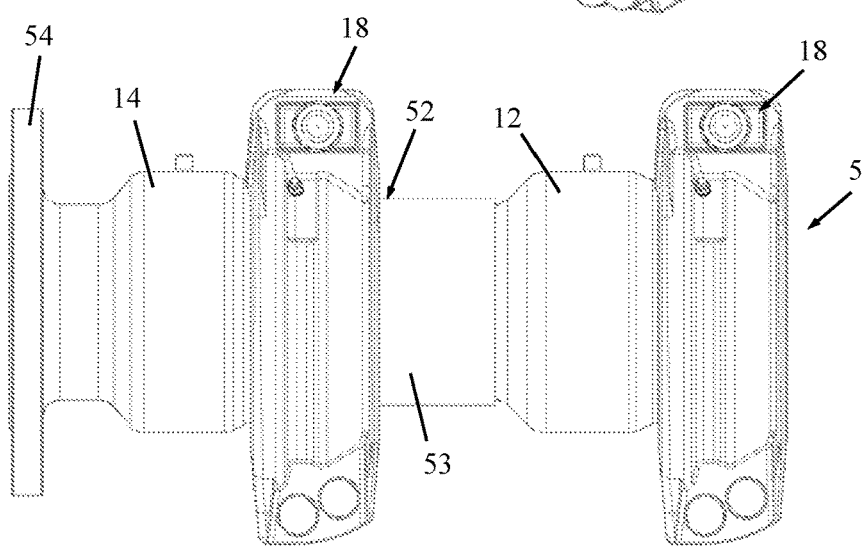
Figure 8:
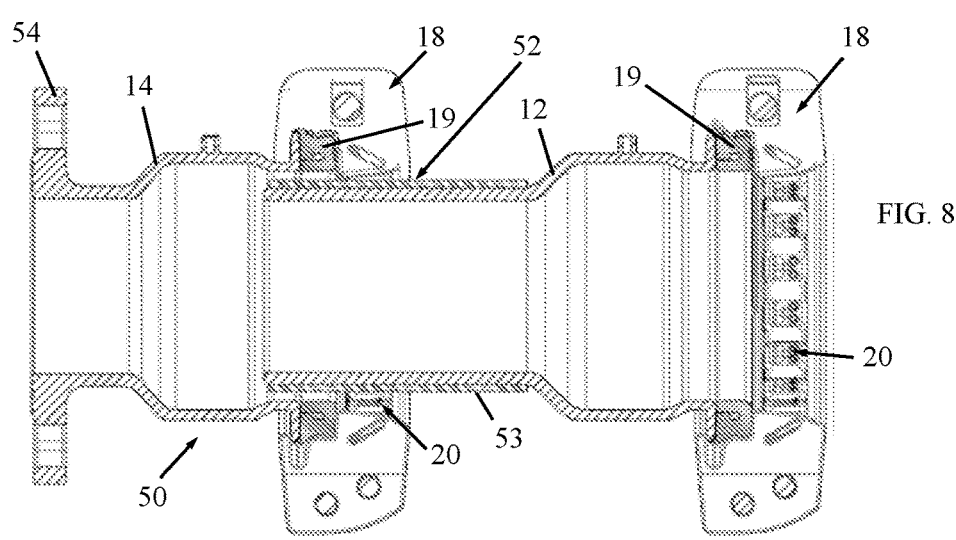

Reference is now made to FIGS. 6-8, which illustrate an adjustable-length anti-corrosion pipe system 50, constructed and operative in accordance with another non-limiting embodiment of the present invention. Pipe system 50 is similar to pipe system 10, with like elements being designated by like numerals. Pipe system 50 differs from pipe system 10 in that there are no axial fixation members. Instead, an annular fixation member 52 is used to achieve electrical insulation between first and second pipe sections 12 and 14. The annular fixation member 52 does not only include annular seal 19, but instead includes pipe connection 18, which as before, is provided with annular seal 19 plus grip ring 20. The annular fixation member 52 tightens grip ring 20 against an electrically insulating sleeve 53 (also referred to as insulator 53) wrapped around the outer contour of first pipe section 12. The electrically insulating sleeve 53 may be made of an elastomeric material. The teeth of grip ring 20 bite into sleeve 53, but do not pierce sleeve 53, and thus do not contact the metal pipe 12. The tightening of annular fixation member 52 against sleeve 53 achieves electrical insulation between first and second pipe sections 12 and 14.

Another difference from pipe system 10 is that in pipe system 50 the outer end of second pipe section 14 is provided with a flange 54 instead of a pipe connection.

Figure 9:
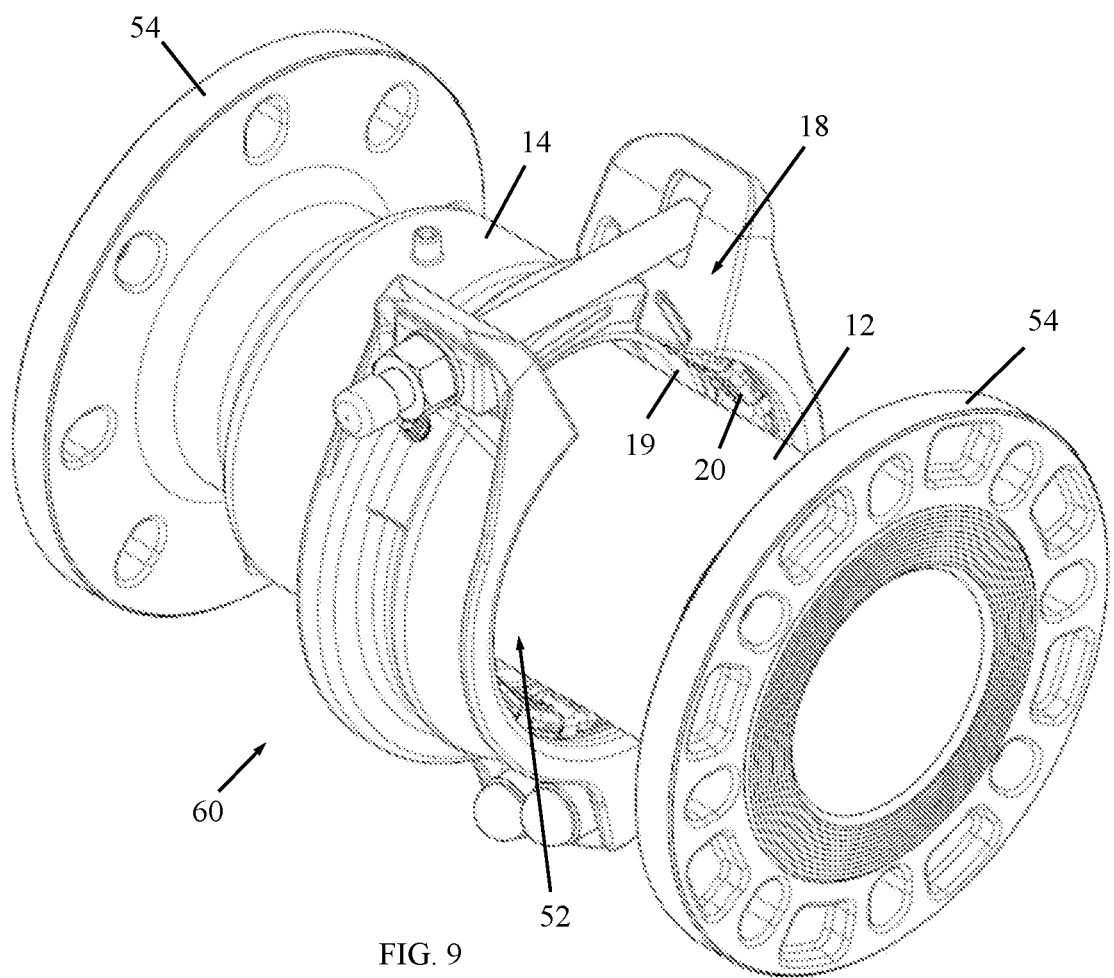
FIG. 9 is a simplified pictorial illustration of an adjustable-length anti-corrosion pipe system, constructed and operative in accordance with another non-limiting embodiment of the present invention, and including flanges at both ends of the pipe system.

Reference is now made to FIG. 9, which illustrates an adjustable-length anti-corrosion pipe system 60, constructed and operative in accordance with another non-limiting embodiment of the present invention. Pipe system 60 is similar to pipe system 50, with like elements being designated by like numerals. Pipe system 60 differs from pipe system 50 in that the outer ends of both first and second pipe sections 12 and 14 are provided with flanges 54.

What is claimed is:

1. A pipe system comprising:
a first pipe section and a second pipe section arranged, and together defining a total length, along a longitudinal axis, said first and second pipe sections being movable and telescopic with respect to each other so as to shorten or lengthen the total length; and
a fixation member that clamps a portion of said second pipe section to a portion of said first pipe section, said fixation member comprising an insulator which is electrically insulating and passes no electrical current between said first and second pipe sections;
wherein said fixation member comprises one or more axial fixation members secured to lugs extending from said first and second pipe sections, wherein in a first telescoping position said one or more axial fixation members protrude a first amount axially beyond said lugs and in a second telescoping position said one or more axial fixation members protrude a second amount axially beyond said lugs, said first amount being less than said second amount, and wherein said insulator passes no electrical current between said first and second pipe sections in both said telescoping positions.

2. The pipe system according to claim 1, wherein said insulator comprises an electrically insulating bushing that sits in each of said lugs.

3. The pipe system according to claim 1, further comprising a grip ring that clamps against an electrically insulating sleeve wrapped around an outer contour of said first pipe section, wherein said grip ring does not pierce said sleeve.

4. The pipe system according to claim 1, wherein at least one of the outer ends of said first and second pipe sections respectively, comprises a pipe connection, and said pipe connection comprises an annular seal plus a grip ring.

5. The pipe system according to claim 1, wherein said first and second pipe sections are coated with an anti-corrosion coating.

6. The pipe system according to claim 1, wherein at least one of said first and second pipe sections comprises a cathodic protection outlet.

7. The pipe system according to claim 1, wherein at least one of said first and second pipe sections comprises a lifting ear.

8. The pipe system according to claim 1, wherein said one or more axial fixation members are one or more elongate bars or rods and said insulator comprises one or more portions of said one or more elongate bars or rods.

\* \* \* \* \*